(No Model.)

I. K. CLEAVER.
SECTIONAL CAM FOR STAMP MILLS.

No. 455,506. Patented July 7, 1891.

Witnesses,
J. H. Nurse
H. C. Lee.

Inventor
Isaac K. Cleaver
By Dewey & Co.
Attys

THE NORRIS PETERS CO., PHOTO-LITHO., WASHINGTON, D. C.

UNITED STATES PATENT OFFICE.

ISAAC K. CLEAVER, OF SAN FRANCISCO, CALIFORNIA.

SECTIONAL CAM FOR STAMP-MILLS.

SPECIFICATION forming part of Letters Patent No. 455,506, dated July 7, 1891.

Application filed December 1, 1890. Serial No. 373,234. (No model.)

*To all whom it may concern:*

Be it known that I, ISAAC K. CLEAVER, a citizen of the United States, residing in the city and county of San Francisco, State of California, have invented an Improvement in Sectional Cams for Stamp-Mills; and I hereby declare the following to be a full, clear, and exact description of the same.

My invention relates to a sectional cam which is especially applicable for use with ore-crushing stamp-mills; and its object is to provide a cam which may be easily removed or replaced upon the shaft without disturbing any of the adjacent ones.

It consists of a two-part cam with means for fitting and securing it upon the shaft or removing it therefrom, and in certain details of construction, which will be more fully explained by reference to the accompanying drawings, in which—

Figure 1:
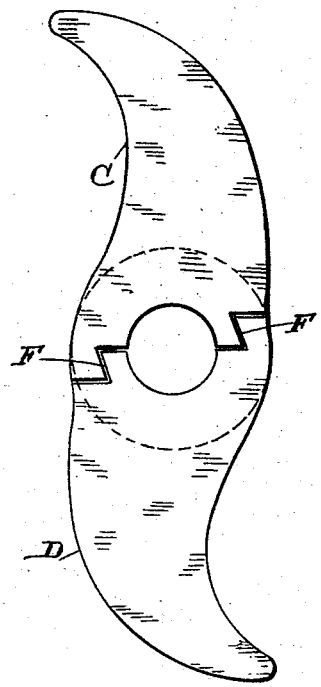
Figures 2, 3:
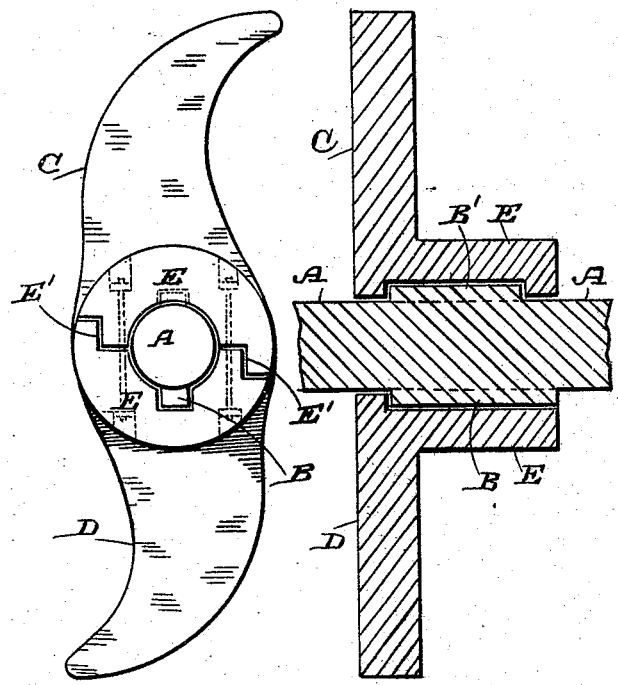
Figure 4:
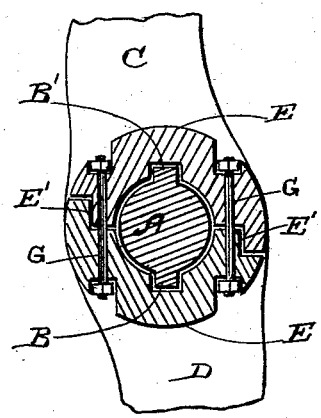
Figure 5:
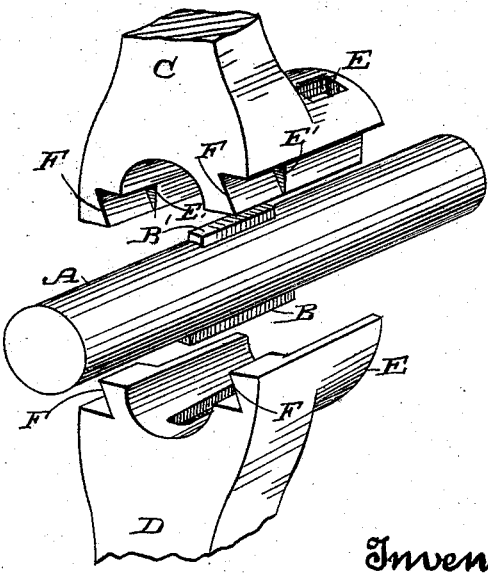

Figure 1 is an end view of my cam in place, showing dovetailed joints. Fig. 2 is a view looking toward the opposite end, showing plain joints. Fig. 3 is a section taken in a plane through the axis of the shaft. Fig. 4 is a transverse section taken through the line of the bolts. Fig. 5 shows the parts of the cam separated and removed from the shaft.

A is the cam-shaft, which is journaled above the "battery" or "mortar," so called, and which usually has a series of five cams fixed upon it for each mortar. Upon this shaft are fixed the keys B and B' upon opposite sides, these keys being of a sufficient length for each cam, and the keys of the different cams are fixed upon the shaft, so that the cams will be lifted successively. Usually the cam at one end lifts its stamp; then the cam at the opposite end; third, the one nearest the first-mentioned one; fourth, the one nearest the second outside cam, and, lastly, the central one, and these cams are so spaced that the stamps will be lifted successively and at regular intervals. In my invention the keys B and B' are fixed permanently upon the shaft, one of them being somewhat shorter than the other.

C and D are the two parts of the cam having the projecting hubs E at one side. One of these hubs has a channel cut within it closed at each end and of such shape and size as to exactly fit over the shortest of the keys B'. The other half of the cam has a channel made in it to fit over the opposite key, and this channel is closed at the end where the cam is situated, but is open at the opposite end of the hub, so that this portion of the hub may be slipped along the key and also along the other half of the cam, when the bolts holding the two together are removed. The two parts of the hub have semi-cylindrical grooves formed in them which fit the shaft, and they are fitted together at one end, as shown by the rectangular lines of meeting at E'. Upon the opposite end and side of the cam the two parts come together in the form of a dovetail, as shown at F.

G G are bolts passing through the hub, having nuts upon their outer ends by which the two parts are firmly secured together and clamped upon the shaft, so that the keys upon the shaft fit in the slots or channels made in the cam-hubs.

The object in making the dovetail lock (shown at F) to extend only part of the length of the hub, while the other portion is made rectangular, is in order to allow room enough to take the cam off when necessary.

In a battery the stamps are placed as near together as their diameter will admit, and this brings the stamp-stems, with their tappets, and the cams also, very closely together, the cams being so near each other upon the shaft that the whole length of the hub could not be moved sidewise before it would strike the next adjacent cam. For this reason the dovetail portion or lock is made short enough so that one portion of the cam may be moved sidewise from the other, sliding longitudinally upon the key over which it fits, and the open end of the slot in the hub which fits over this key allows of this movement. This portion of the cam is then moved until the dovetail or interlocking part is clear from the corresponding dovetail of the other half of the cam, when that portion of the cam may be taken off at right angles with the shaft, and, this being removed, the other portion of the cam may be taken off directly. The key by which this second portion of the cam is held upon the shaft is of such length as to exactly fit the closed channel in the hub of the cam, and thus prevent any end motion of the cam when it is put together and also insure its being put on at exactly the right place whenever removed. By this construction I am enabled to remove and replace the cams at any time without disturbing the adjacent ones, and much time is saved thereby.

Having thus described my invention, what I claim as new, and desire to secure by Letters Patent, is—

1. The shaft having keys fixed in its opposite sides, a cam having the hub made in two sections fitting the shaft, bolts for uniting the sections, a groove or channel made in one of the sections, closed at each end, so as to fit one of the keys upon the shaft, and a groove or channel formed in the other half of the hub to fit the opposite key, said channel being open at one end, so that this portion of the cam and hub may be slipped longitudinally along the shaft and keys, substantially as herein described.

2. A shaft having keys fixed upon its opposite sides, a cam having the hub made in two parts fitted to the shaft and having grooves or channels which fit the keys upon the shaft, dovetailed interlocking depressions and projections formed upon the opposite meeting portions of the hub, whereby the two parts of the cam may be locked together by sliding one upon the other, and bolts for clamping the hub together after it is in place, substantially as herein described.

3. A shaft having keys permanently fixed upon its opposite sides, a cam having the hub made in two sections which are fitted to the shaft, and having grooves or channels fitting over the keys of the shaft, as shown, one of said channels being made open at one end, so that that portion of the hub may slide longitudinally upon the shaft and key, interlocking tongues and grooves formed upon the opposite meeting faces of the hub, one end of said tongues and grooves being made rectangular and the others made dovetail, so that when slipped upon each other they form a lock to hold the two parts of the cam together, and bolts for clamping the hub together after it is in place, substantially as herein described.

In witness whereof I have hereunto set my hand.

ISAAC K. CLEAVER.

Witnesses:
S. H. NOURSE,
H. C. LEE.